July 12, 1932.  J. SYLVESTER  1,867,389
FEEDER FOR GLASS LEERS
Filed Jan. 7, 1931  3 Sheets-Sheet 1
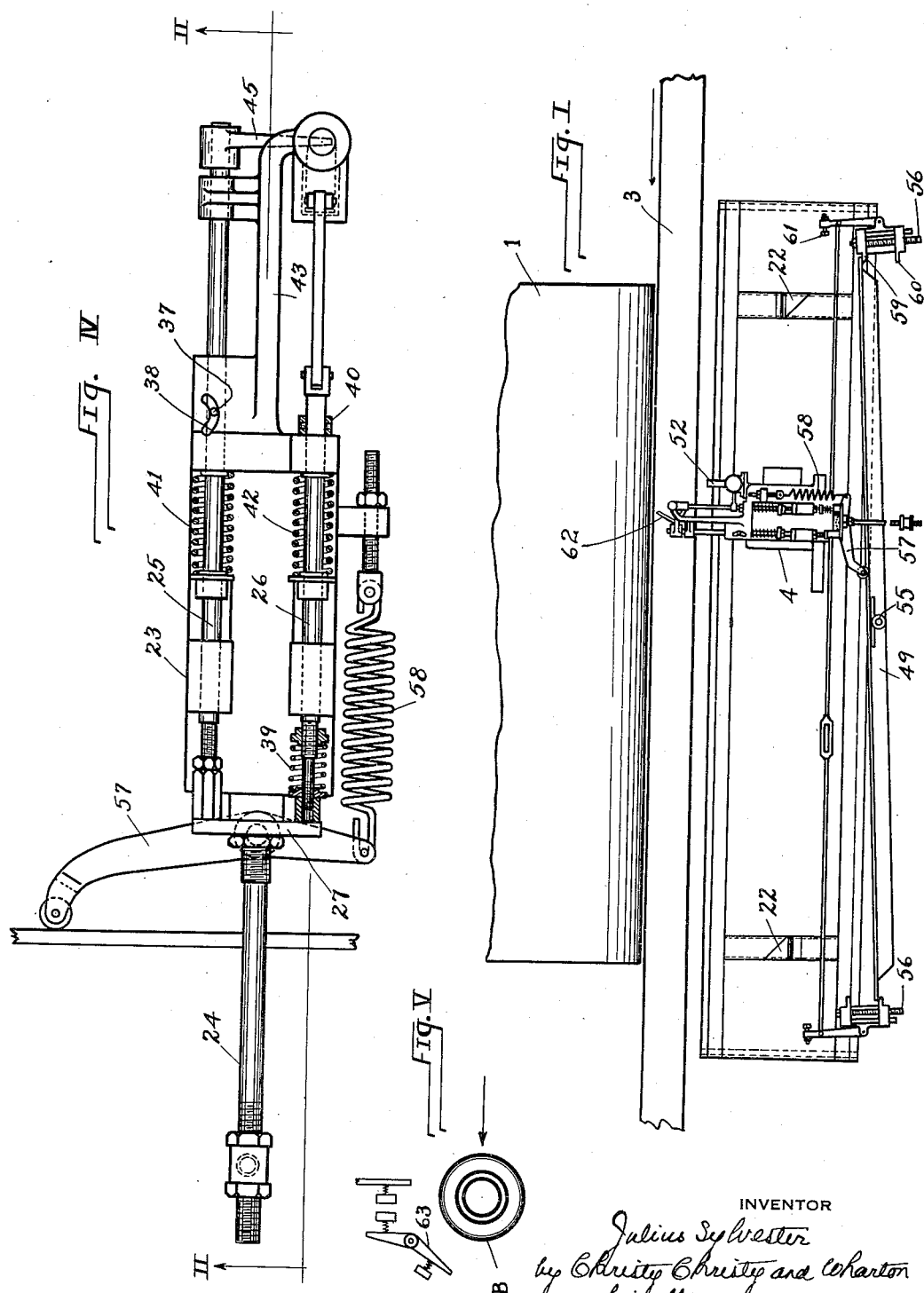
INVENTOR
Julius Sylvester
by Christy Christy and Wharton
his attorneys July 12, 1932.  J. SYLVESTER  1,867,389
FEEDER FOR GLASS LEERS
Filed Jan. 7, 1931  3 Sheets-Sheet 2
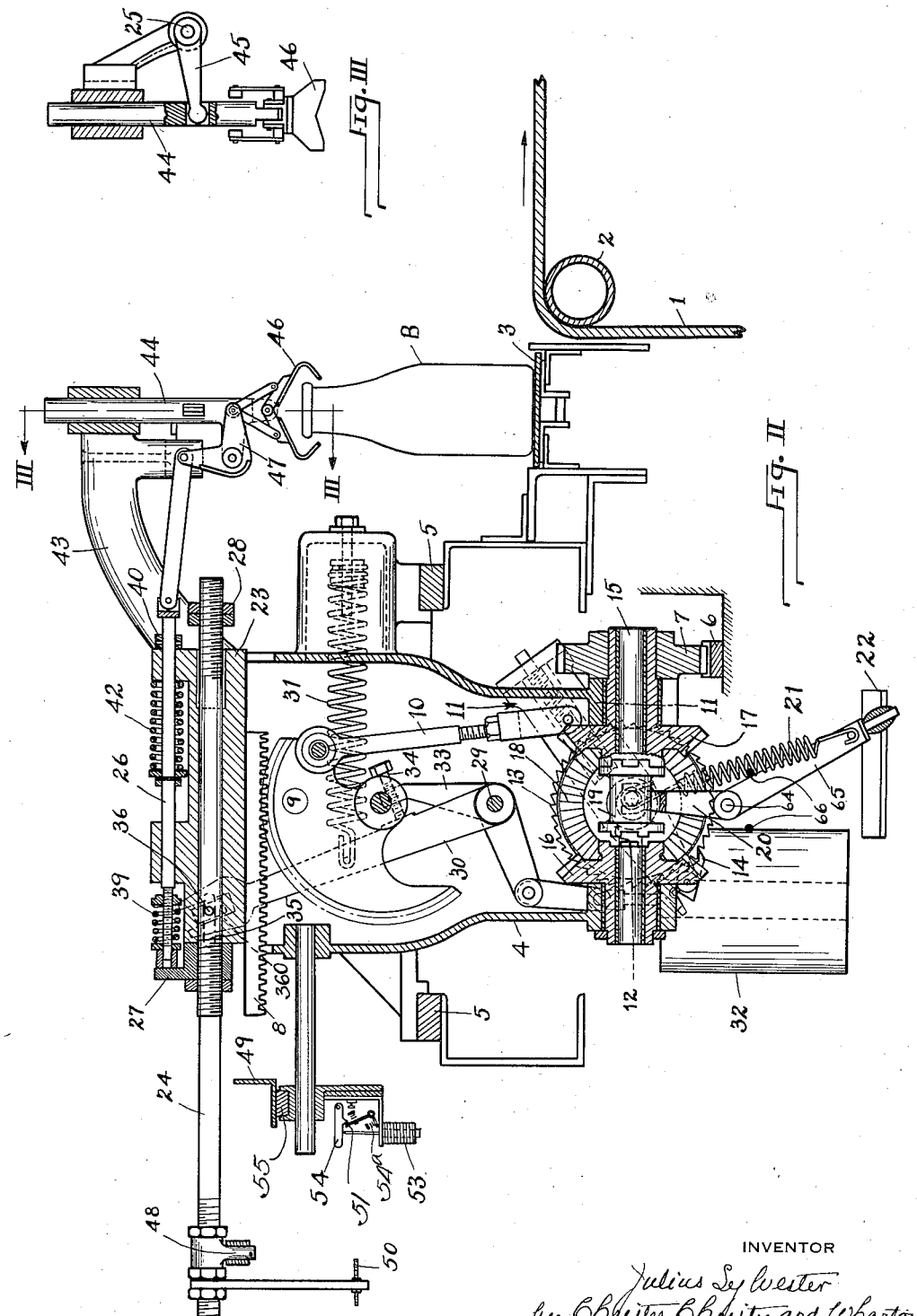
INVENTOR

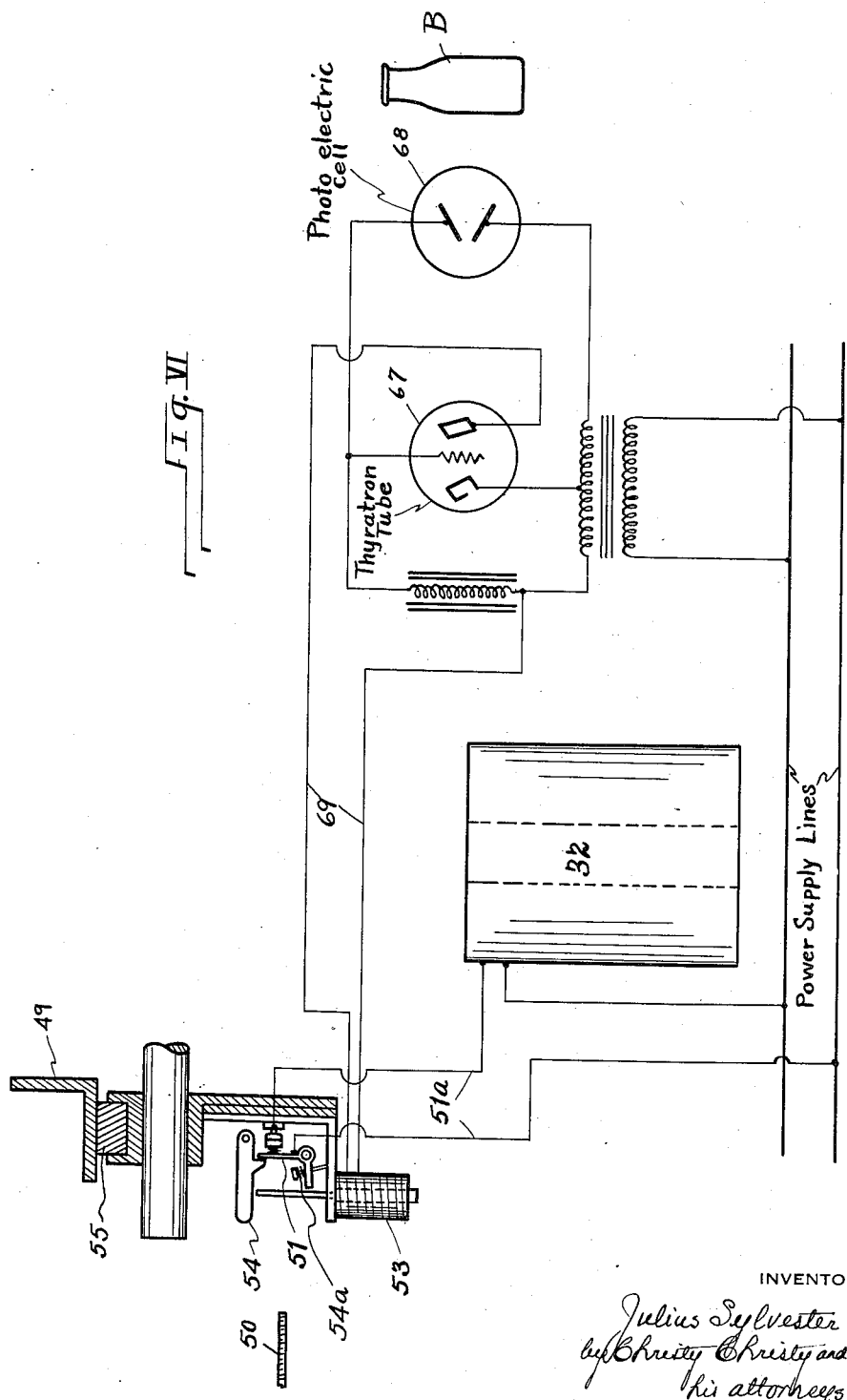

Patented July 12, 1932

1,867,389

UNITED STATES PATENT OFFICE

JULIUS SYLVESTER, OF WASHINGTON, PENNSYLVANIA, ASSIGNOR TO SIMPLEX ENGINEERING COMPANY, A CORPORATION OF DELAWARE

FEEDER FOR GLASS LEERS

Application filed January 7, 1931. Serial No. 507,072.

My invention relates to conveyor mechanism, and specifically to mechanism for effecting the transfer of a succession of articles from one moving conveyor to another. It finds practical application in the loading of glass leers with articles such as bottles, for example, as they come from the bottle-forming machinery. Manifestly it is applicable to operation upon articles of different sizes and shapes, by whatever methods and by whatever means produced; I shall, however, show it in operation upon milk bottles. Generally stated, the apparatus of the invention is automatic, adapted to take a succession of articles as they advance upon a conveyor across the door of a leer and to place them in a succession of transverse rows upon the leer conveyor.

In the accompanying drawings Fig. I is a view in plan from above of apparatus embodying the invention, shown in association with the conveyor of a leer and with a feed conveyor which brings the articles to the mouth of the leer. Fig. II is a view to larger scale in vertical section longitudinally of the leer conveyor and transversely through the carriage in which the ware-engaging instrumentalities are borne. Fig. III is a fragmentary view in vertical section, on the plane indicated by the line III—III, Fig. II; Fig. IV is a fragmentary view to like scale with Fig. II, showing certain of the parts in plan from above. The sectional showing of Fig. II is upon the broken plane indicated at II—II, Fig. IV. Fig. V is a fragmentary view in plan, illustrating a detail of mechanical organization which may be used alternatively to a certain part shown in Fig. I. Fig. VI repeats, fragmentarily, a portion of the showing of Fig. II, and consists additionally of a wiring diagram of a certain electric control.

Referring to Figs. I and II a portion of the belt conveyor of a glass leer is indicated at 1. It may be understood that this portion of the conveyor is at the intake end of the leer. Rising vertically, this conveyor passes over a roll 2, and then advances horizontally, in the direction indicated by an arrow. Across the face of the leer conveyor 1 at the intake end of the leer and adjacent the transverse line along which the leer conveyor rounds the roll 2, a second conveyor 3 advances, in the direction indicated by an arrow, Fig. I. The conveyor 3, as will be understood, brings to the leer mouth a succession of articles (in this illustration, milk bottles B), newly formed and ready to be annealed. The apparatus of my invention serves to lift the articles one by one from conveyor 3 and to carry them and to set them down again in proper order upon conveyor 1. With respect to the transfer mechanism, conveyor 3 is the approaching conveyor and conveyor 1 the receding conveyor.

A carriage 4 is movable upon rails 5 in parallel course with and adjacent to conveyor 3. The carriage is caused to travel upon the rails by the rack-and-pinion drive 6, 7, mounted in carriage 4 is a certain transversely reciprocable rack 8. The rack 8 is in mesh with a segmental pinion 9, and pinion 9, rotatably mounted in the carriage, is by a link 10 connected to a beam 11, idly mounted to rotate upon a shaft 12. The shaft 12 carries a ratchet-disk 13 and beam 11 carries a co-operating pawl 14. By such connection, as rack 8 reciprocates, with each right-to-left traverse of the rack (Fig. II) the shaft 12 is rotated counter-clockwise. Given a definite range of traverse of rack 8, it will be perceived that by the adjustments indicated, of the length of link 10 and of the effective length of the power arm of beam 11, the range of turning of shaft 12 may be accurately adjusted. The pinion 7 is fixed upon its axle 15, and upon the axle 15 are idly mounted the companion beveled pinions 16 and 17 of a clutch. A companion beveled pinion 18 is fixed upon shaft 12, and as shaft 12 turns, the two pinions 16 and 17 are rotated, and rotated oppositely upon axle 15. A clutch-block 19 splined upon axle 15 slides to alternate engagement with pinions 16 and 17, and according as block 19 engages one pinion or the other, the right-to-left traverse of slide 8 effects travel of the carriage upon its rails in one direction or the other. The clutch-block 19 is shifted from one to the other of its alternate positions by the swinging of an arm 20 which turns freely upon a shaft 64. A second arm 65 turns freely upon the same shaft and the two arms at their outer ends are engaged by a spring 21. Obliquely faced stops 22, set adjacent the tracks at opposite ends of the range of carriage travel, effect automatic swinging of the arm 65; and as arm 65 is thus swung from one side to the other across the diameter in which arm 20 extends, the spring 21 is effective to throw clutch block 19 from engagement with one to engagement with the other of the two beveled-gear members 16 and 17, with the consequence and effect that the direction of travel in response to the right-to-left shifting of rack 8 is reversed. Stops 66 may be provided for limiting the range of swing of arm 65.

The rack 8 which engages the pinion sector 9 is united to a block 23, and the whole constitutes a slide movable upon carriage 4 in a direction transverse to that of carriage travel. Block 23 is provided with three bores, extending longitudinally through the block and transversely of the direction of carriage travel, and in these three bores three rods 24, 25, and 26 are reciprocable. The rod 24 is provided with adjustable abutments, which, engaging block 23 alternately at opposite ends, shift the block as the rod is longitudinally shifted. The abutments are normally spaced at an interval apart greater than the length of the block, and there is, accordingly, a certain amount of lost motion, as between the travel of the rod and the travel of the block.

The carriage 4 bears a rotatable shaft 29, and from the shaft extends an arm 30. The shaft extends in the direction of carriage travel and, consequently, the swing of the arm is transverse to the direction in which conveyor 3 advances, but in accord with the direction in which conveyor 1 advances.

Means are provided for swinging oppositely, first in one direction and then in the other, the arm 30. I show as the means for causing the arm to make its forward and ware-carrying swing a spring, and as the means for causing the arm to make its return swing an electromagnet, but these are exemplary, merely; they might be interchanged, and other particular means within the knowledge of the engineer may be employed for effecting either movement.

A spring 31 (of adjustable effective strength) anchored in carriage 4 tends to swing arm 30 in clockwise direction, as seen in Fig. II (that is to say, through its ware-carrying swing); and electromagnet 32 acting through a bell-crank lever 33 (which swings upon shaft 29) and through a pin 34 borne adjustably by the work arm of the lever is effective to swing arm 30 in counter-clockwise direction. A block 360 is being in the forked outer end of the arm 30 and in it a pin 36 borne by rod 24 has bearing. As the arm 30 swings, this block 360 slides in the fork which carries it through a relatively minute interval. The block 23 is slotted at 35 to afford clearance for the pin 36 as the arm 30 swings.

Rod 25 is provided with an outstanding pin 37 which engages a slot 38 formed in the substance of block 23, and the abutment of the pin upon the ends of the slot limits the range of reciprocation of rod 25 in its bore in block 23. In addition to being reciprocable longitudinally, rod 25 is rotatable also in its bore in block 23, and the slot 38 in the block 23 is so shaped that as the rod reciprocates (beginning with its normal inactive position, at the left, Fig. IV), it first rotates counter-clockwise (Fig. III); then in a succeeding interval of advance it is not rotated; and, finally, in the ultimate portion of its advance it rotates oppositely (clockwise, Fig. III). In the reverse reciprocation, these rotations, with the intermediate interval of non-rotation, are reversed. Rod 26 is telescopic and its components are held in extended position, and the rod is thus normally maintained at maximum length, by the tension of a spring 39. Rod 26 is further provided with a stop 40 which abutting upon block 23 limits the right-to-left reciprocation of the rod in its bore in block 23. The rods 25 and 26 are normally held by springs 41 and 42 at the extreme leftward limit of their right-to-left reciprocation, and when so held they extend equally to the left from the face of block 23. It remains to add in this connection that spring 39 is stronger than spring 42. The parts are so proportioned and arranged that as rod 24 reciprocates from left to right, in accord with the clockwise swing of arm 30, the rod-borne stop 27 engages first the ends of rods 25 and 26, and, after a preliminary shifting of rods 25 and 26 (through an interval corresponding to the length of slot 38), it engages block 23.

Block 23 carries a bracket 43, and in the crooked extremity of this bracket is formed, on an axis arranged in common plane with the axis of rod 26, a vertically disposed bore. In this bore a head 44 is reciprocable. The rod 25 is provided with an arm 45 which is jointed to head 44; so that rotation of rod 25 effects vertical reciprocation of head 44. To the head 44 a pair of work-engaging jaws 46 is pivoted. A pair of bell-crank levers 47, pivoted in head 44, are linked by one arm to rod 26 and by the other arm to jaws 46.

In operation, as arm 30 swings clockwise, driving rod 24 in left-to-right traverse, abutment 27 first engages the ends of rods 25 and 26, and, in the further advance of rod 24, the abutment 27 shifts the two rods 25 and 26 from left to right, with compression of springs 41 and 42. In the initial period of advance of rods 25 and 26, rod 25 rotates counter-clockwise (Fig. III) and head 44 descends to proximity to a bottle B resting on carrier 3. In the further and second stage of rod reciprocation rod 25 does not rotate. Rod 26, however, as it continues to advance, effects a swinging of bell-crank levers 47, with the consequence and effect that jaws 46 close upon the neck of the bottle B. In the final and third stage of rod reciprocation rod 25 rotates oppositely, and in so doing raises head 44, and with it the engaged bottle B. The bottle is thus raised free of conveyor 3. During this time of rise of head 44 rod 26 is restrained from free reciprocation, and in consequence spring 39 is compressed and the telescopic rod is reduced in length.

When the parts have reached the position indicated, abutment 27 comes to engagement upon block 23, and the further clockwise swing of arm 30 carries the entire slide, including block 23 with its attached rack 8, from left to right, transversely of the line of carriage travel. In this travel of the slide the bottle is carried from the position above conveyor 3, from which it has been raised, to a position above conveyor 1, upon which it is to be deposited.

Rod 24 is provided with an adjustable block 48 and in a stationary part of the structure stop rail 49 is adjustably mounted, and by abutment of these parts the left-to-right advance of the slide is arrested. As the block approaches abutment upon stop rail 49, a pin 50 borne by rod 24 engages and swings a spring-backed contact piece 51, mounted upon stop rail 49, and closes an electric circuit 51a; and a gravity latch 54, raised by the advance of contact piece 51, falls to place behind it and secures the contact in closed position against the tension of a spring 54a. The closing of this contact and the completion of circuit 51a energizes electromagnet 32. Immediately on energizing, the power of the magnet, exceeding the tension of spring 31, effects the reverse and counter-clockwise swing of arm 30 and the return of rod 24 and its associated parts to their initial position. Meanwhile latch 54 is effective to maintain contact 51 closed and magnet 32 in energized condition. Fig. II shows the contact open and the latch 54 inactive and resting by gravity upon the spring-backed and movable member 51 of the contact. This is the position in which these parts are found while the slide is advancing from left to right and carrying a bottle from conveyor 3 to conveyor 1. When pin 50 engages and swings the contact piece 51, latch 54 swings aside and then immediately falls behind the contact piece 51 and holds it against spring tension in circuit-closing position, shown in Fig. VI.

The first effect of the recession of abutment 27 is to cause springs 41, 42, and 39 to exert their tension upon rods 25 and 26; rod 25 begins to recede in block 23, turning as it goes, while telescopic rod 26, restrained by its linkage to head 44 and subject to the tension of spring 39, elongates. In this initial stage of operation head 44 descends and bottle B is brought to position upon conveyor 1. Immediately, in the further right-to-left progress of the rods, rotation of rod 25 ceases, head 44 remaining at rest in its lowered position, retrogression of the now expanded rod 26 effects the opening of jaws 46, and the bottle B rests free upon conveyor 1. In the third stage of rod recession rod 25 rotates oppositely, raising head 44 again to the upper limit of its range. Thereupon abutment 28 comes to bearing upon block 23, and in the further right-to-left reciprocation of rod 24 the parts are returned to their initial position, with the bottle-engaging jaws above conveyor 3, ready to descend and in renewed cycle of operation to engage another bottle on conveyor 3.

The carriage 4 is equipped with an electric circuit controlling means adapted to respond periodically to the advance of a bottle upon conveyor 3. The means may be such as the designer prefers. I have in Fig. I of the drawings indicated at 52 a small casing borne by the carriage. This casing may be understood to be provided with a window and to contain a thyratron tube. In Fig. VI the thyratron tube is indicated at 67.

The casing is so arranged that a bottle (or other article) advancing on conveyer 3 passes the window and in passing effects a diminution of and/or a refraction of the light entering the window. This change in illumination, through the intermediation of a photo-electric cell 68, effects a change in intensity of the current in an electric circuit 69. This pulsation in current strength is effective, through an electromagnet 53, arranged in the circuit, to raise the latch 54, whereupon the contact piece 51 (which to this end is spring-backed) swings, circuit 51a is broken, and magnet 32 is deenergized. Spring 31, whose tension is unequal to the power of magnet 32, then becomes again effective to swing arm 30 clockwise, with repetition of the described cycle of operation. The parts are so adjusted that the machine in its operation then engages the bottle which has thus effected the action of the thyratron tube. Thus, by the means described, each bottle in its progress upon conveyor 3 automatically sets in operation the instrumentalities by which presently it is picked up, carried, and set down again upon conveyor 1.

The carriage 4 is provided with a guide 62 which, engaging the bottle advancing upon conveyor 3, brings the bottle accurately to position to be grasped by jaws 46.

Instead of a thyratron tube, alternative means such as indicated in Fig. V may be provided for effecting the energizing of the magnet 53 by the advance of ware upon conveyor 3. These means consist of a delicate spring-backed switch 63, normally open, but closed intermittently by the advance of bottles B.

As block 23 advances from left to right, Fig. II, carrying a bottle from conveyor 3 to conveyor 1, sector 9, engaged by rack 8, is turned clockwise, and pawl 14 recedes upon ratchet disk 13; as block 23 makes its return, right-to-left traverse, sector 9 is turned counter-clockwise, and ratchet disk 13 is by pawl 14 rotated through a predetermined angular range. In consequence, carriage 4 is advanced upon its tracks through a predetermined interval. Thus in succeeding operations of the ware-transferring apparatus the carriage advances step by step along its course, and the step interval is an approximately constant one; and the ware-transferring apparatus, having in response to the advance of a bottle upon conveyor 3 transferred the bottle from conveyor 3 to conveyor 1, comes to position ready to be set in operation again by another bottle advancing upon conveyor 3 and to take it, in turn, and to place it upon conveyor 1, spaced transversely upon conveyor 1 at a proper interval from the bottle last previously placed.

As the so advancing carriage comes to the limits of its movement transversely of conveyor 1, the lever 20 engaging the stop 22 is swung; the clutch block 19 is shifted; and in the succeeding operations of the ware-transferring apparatus the direction of carriage advance is reversed.

The range of left-to-right advance of the slide 23, carrying a bottle from conveyor 3 to conveyor 1, is determined by the abutment of block 48 upon stop rail 49. As appears in Fig. I, stop rail 49 is obliquely disposed, and inclines from left to right toward conveyor 1. It will be understood that carriage 4 is on left-to-right traverse. Manifestly, the consequence and effect of such inclination of stop rail 49 are that the ware-transferring apparatus in each succeeding operation will carry the article through a greater interval. This increasing interval of transfer affords compensation for the slow but constant advance of conveyor 1, and the machine may by the means described be co-ordinated to set down upon conveyor 1 a succession of articles arranged accurately in transverse line. The stop rail 49 is pivoted at 55 to swing from a position of inclination in one direction to a position of inclination in opposite direction, and means are provided for effecting automatically the shifting of the stop rail from one position to the other when the carriage comes to the end of its range of advance.

The range of swing of stop rail 49 is defined by two swinging latches 56 which engage its opposite ends, as shown in Fig. I. The two latches are interconnected and are reversed in their positions by abutments of the carriage 4 upon one or the other of the stops 61 with which the latches are equipped, as the carriage comes alternately to the limits of its range. The carriage carries a lever 57 which by the tension of a spring 58 is held to bearing upon stop rail 49. It will be perceived that as carriage 4 approaches the limit of its range in either direction the tension of spring 58 becomes effective through lever 57, as soon as latches 56 are reversed, to swing stop rail 49 from one to the other of its oppositely inclined operative positions. Each latch includes two rail-engaging fingers which, together with the pivot 55, afford positive backing of the rail in bringing the ware-transferring slide to rest; of these the inner finger 59 is shorter than the outer finger 60. In consequence, when the two latches in the course of swing come to mid-position the stop rail is free, and at that instant, driven by spring 58 and passing beyond the end of the finger 59 of one latch, it swings to abutment upon the longer, outer finger 60 of the other latch.

It will be particularly observed that when, at the completion of carriage advance in either direction, beam 49 has swung, the advance of the ware-transferring apparatus upon conveyor 1 will be less than the immediately preceding advance by the interval which is approximately the interval of retrograde swing of rail 49. Accordingly, the succeeding rows of bottles as they are set upon conveyor 1 are properly spaced, row upon row. And this spacing also is automatically accomplished.

In summary, operation is as follows, the position being that of Fig. I. When an article to be transferred, advancing from right to left upon conveyor 3, comes opposite the window of the casing 52 in which the thyratron tube is contained, electro-magnet 32 is de-energized. Thereupon spring 31 becomes effective to swing arm 30 clockwise (Fig. II) and to shift rod 24 from left to right, until block 48 abuts upon rail 49. In this shift of rod 24 head 44 descends, with jaws 46 in open position; the jaws close upon the article; the head rises; and the elevated article is borne from a position above conveyor 3 to a position above conveyor 1. The closing of contact 51 then effects the energizing of magnet 32, and arm 30 is swung back in counter-clockwise course through its range, and rod 24 is reciprocated back to its initial position. In this retrograde shift of rod 24 the article is lowered to conveyor 1, the jaws 46 open, head 44 rises again; the head then recedes from position above conveyor 1 to its initial position above conveyor 3, ready to perform again its cycle of operation. During the retrogression of head 44 from its position above conveyor 1 to its initial position above conveyor 3 the carriage has advanced in left to right course (Fig. I) through a predetermined interval. When thereafter another article advancing upon conveyor 3 comes to position opposite the window in casing 52, transference of this second article is effected as before. In consequence of the obliquity of stop rail 49 the range of travel of the transfer apparatus is in each succeeding operation through a wider interval, with the consequence and effect that a succession of articles may be placed on the advancing conveyor 1 in a line which is perpendicular to the direction of advance of the conveyor, or in a line disposed at any desired angle to that direction of advance. When the advancing carriage comes to the limit of its range (which corresponds to the width of conveyor 1) the carriage-driving instrumentalities are automatically shifted, so that the direction of carriage advance is reversed, and the means by which the transfer mechanism is controlled are automatically shifted, so that in the reverse traverse of the carriage a new row of articles is set down upon conveyor 1 at proper interval to rearward of the immediately preceding row.

The provisions for adjustment of the cooperating parts are to be remarked, for by these means the apparatus may be brought to accuracy of operation. The springs 31, 39, and 58 are adjustable in tension. Link 10 is adjustable in length; the effective length of the power arm of beam 11 is adjustable; the pin 34 is adjustable in effective length. The abutments 27, 28, and 48 borne by rod 24 are adjustable both in their relative and in their actual positions. The trip-pin 50 is adjustable, relatively to abutment 48. The actual and the relative positions of the fingers 59 and 60 of the latches 56 are adjustable, and contact of carriage 4 upon these latches is effected through pins 61 which also are adjustable.

I claim as my invention:

1. In transfer apparatus, and in combination with two conveyors traveling in courses at right angles one to the other, a carriage movable in the direction of the course of one of the said conveyors and equipped with an arm extensible in the direction of the course of the other conveyor and means for limiting the extension of the said arm to a range varying with the position of the carriage relatively to said conveyors.

2. In transfer apparatus, and in combination with two conveyors traveling in courses at right angles one to the other, a carriage movable in the direction of the course of one of the said conveyors and equipped with an arm extensible in the direction of the course of the other conveyor, means borne by the carriage for extending said arm, and means for limiting the extension of the said arm to a range varying with the position of the carriage relatively to said conveyors.

3. In transfer apparatus, and in combination with approaching and receding conveyors traveling in courses at right angles one to the other, a carriage movable in the direction of the course of the approaching conveyor and equipped with ware-transferring apparatus extensible in the direction of the course of the receding conveyor, means borne by the carriage for extending the said ware-transferring apparatus, an automatic control of the said extending means, such control being subject to the advance of a piece of work on the said approaching conveyor, said ware-transferring apparatus including article-gripping tongs, means to open and close said tongs, to engage and release a piece of work, means to move said tongs vertically, to raise the piece of work from the approaching conveyor and set it down upon the receding conveyor, the said means to open and close the tongs and the said means to move the said tongs vertically being automatically responsive to the movement of the said ware-transferring apparatus in its bearing in the said carriage.

4. In transfer apparatus, and in combination with approaching and receding conveyors traveling in courses at right angles one to the other, a carriage movable in the direction of the course of the approaching conveyor and equipped with an arm extensible in the direction of the course of the receding conveyor, means borne by the carriage for extending the said arm, an automatic control of the said arm-extending means, such control being subject to the advance of a piece of work on the said approaching conveyor, and means limiting the extension of said arm to a range varying with the position of the carriage relatively to said conveyors.

5. In transfer apparatus, and in combination with approaching and receding conveyors traveling in courses at right angles one to the other, a support, a carriage movable on said support in the direction of the course of the approaching conveyor and equipped with an arm extensible in the direction of the course of the receding conveyor, two prime movers borne by the carriage, one adapted to effect the extension of said arm and the other adapted to effect both the regression of the said arm and the movement of the carriage on said support, means operative by a piece of work advancing on the approaching conveyor for rendering one of said prime movers effective, and means operative in sequence upon the means last defined and operative by the extension of the said arm for rendering the other of said prime movers effective.

6. In transfer apparatus, and in combination with approaching and receding conveyors traveling in courses at right angles one to the other, a support, a carriage movable on said support in the direction of the course of the approaching conveyor and equipped with an arm extensible and retractible in the direction of the course of the receding conveyor, a member reciprocably mounted in said carriage, two prime movers borne by the said carriage, connected with said reciprocable member, and tending to shift the said member, one in one direction, the other in opposite direction, the two said prime movers being unequal in effective power, reciprocation of said member in one direction being effective to extend said arm and reciprocation in opposite direction being effective both to retract said arm and to move the carriage on its support, means rendered operative by the advance of a piece of work on the approaching conveyor for rendering ineffective the prime mover of greater power, and means operated by the extension of said arm for rendering the last-named prime mover effective again.

7. In transfer apparatus, and in combination with approaching and receding conveyors traveling in courses at right angles one to the other, a carriage movable in the direction of the course of the approaching conveyor and equipped with an arm extensible and retractible in the direction of the course of the receding conveyor, a spring borne by the carriage tending to extend said arm, a solenoid borne by the carriage and effective when energized to retract the said arm and to hold it retracted against the tension of said spring, means rendered effective by a piece of work advancing on said approaching conveyor for de-energizing said solenoid, and means rendered effective on the extension of said arm for energizing said solenoid.

8. In transfer apparatus, and in combination with approaching and receding conveyors traveling in courses at right angles one to the other, of a carriage movable in the direction of the course of the approaching conveyor and equipped with an arm extensible in the direction of the course of the receding conveyor, means for limiting the range of extension of said arm, such means including a pivoted stop-rail adapted to swing to alternate operative positions of opposite obliquity with respect to the course of the carriage.

9. The structure of claim 8 together with means automatically operated by carriage advance for swinging said rail.

10. The structure of claim 8, together with means for adjusting the degree of obliquity of said stop-rail.

11. In transfer apparatus, and in combination with approaching and receding conveyors traveling in courses at right angles one to the other, of a carriage movable forward and backward in the direction of the course of the approaching conveyor and within a range corresponding to the width of the receding conveyor, such carriage being equipped with an arm extensible in the direction of the course of the receding conveyor, means for limiting the range of extension of the said arm such means including a stop-rail extending in a position oblique to the direction of carriage advance, whereby successive extensions of the arm of the traveling carriage are of increasingly greater range, the said stop-rail being reversible in its position of obliquity, whereby at the end of the range of travel the next ensuing extension of the arm is of minimum range.

12. In transfer apparatus, and in combination with a conveyor of a carriage movable in the direction of the course of the conveyor and equipped with an arm extensible in a direction transverse to the course of the conveyor, means borne by the carriage for effecting arm extension, such means including a solenoid, and means for controlling the energizing of said solenoid, such controlling means including a thyratron tube borne by said carriage and responsive to the change in the reception of light effected by the advance of a piece of work upon the said conveyor.

13. In transfer apparatus, and in combination with a conveyor, of a carriage movable in the direction of the course of the conveyor, a slide movable transversely upon said carriage, a stem reciprocable transversely in said slide, ware-engaging jaws movably borne by said stem, two rods reciprocable in said slide one of which is telescopically collapsible and means for shifting said rods and collapsing that one which is telescopic and for shifting thereafter the said slide, means effective on the shifting of one of said rods for shifting said stem, and means effective on the collapsing of the other of said rods for moving said ware-engaging jaws.

14. In transfer apparatus, and in combination with a conveyor, of a carriage movable in the direction of the course of the conveyor, a slide movable transversely upon said carriage, a stem reciprocable transversely in said slide, ware-engaging jaws movably borne by said stem, a rod reciprocable in said slide, a second rod rotatable in said slide, means for operating the said ware-engaging jaws in response to reciprocation of the first of the said rods, means for reciprocating said stem in response to rotation of the second of said rods, and means for shifting and rotating the said rods and for shifting the said slide, whereby an article of ware resting on said conveyor is grasped by said jaws, raised from the conveyor, and moved transversely with respect to said conveyor.

15. In transfer apparatus, and in combination with approaching and receding conveyors traveling in courses at right angles one to the other, a carriage movable in the direction of the advance of the approaching conveyor and equipped with an arm extensible in the direction of the advance of the receding conveyor, means for extending the said arm repeatedly and through successively greater ranges of extension, at successive points in the course of such movement of the said carriage, and an automatic control for said arm-extending means, such control being subject to the advance of a piece of work on the said approaching conveyor.

16. In transfer apparatus, and in combination with approaching and receding conveyors traveling in courses at right angles one to the other, a carriage movable in the direction of the course of the approaching conveyor and equipped with an arm extensible and retractible in the direction of the course of the receding conveyor, a member reciprocably mounted in said carriage, connection including a lost-motion feature arranged between and connecting said arm and said reciprocable member, means rendered effective by the advance of a piece of work on the approaching conveyor for reciprocating said member in one direction, and means rendered effective by the extension of said arm for reciprocating said member in opposite direction, the said extensible and retractible arm being equipped with ware-engaging members, and means for operating the said ware-engaging members, the means last named being automatically effective during the period of relative movement between extensible arm and reciprocable member, consequent upon the lost-motion feature of the connection btween them.

17. In transfer apparatus, in combination with a continuously traveling conveyor and a second conveyor moving in a course at right angles to the first named conveyor, a carriage movable substantially in the direction of the course of the second-named conveyor and equipped with an arm extensible substantially in the direction of the course of the first-named conveyor, means for reciprocating said arm to move articles from the second-named conveyor to the first-named conveyor, and means for determining the extreme limits of successive movements of said arm toward the first-named conveyor to compensate for movement of said first-named conveyor, whereby a plurality of articles may be successively placed in a transverse row on said first named conveyor perpendicular to the course thereof.

18. In transfer apparatus, and in combination with two conveyors traveling continuously in courses at right angles to one another, a carriage movable in the direction of the course of one of said conveyors and equipped with an arm extensible in the direction of the course of the other conveyor, and means for progressively varying succeeding extensions of said arm during a single course of movement of said carriage to compensate for the continuous movement of said other conveyor, whereby articles may be placed on said other conveyor by said arm in a row perpendicular to the course of movement of said other conveyor.

19. In transfer apparatus, and in combination with two conveyors traveling in courses at right angles one to the other, a carriage movable in the direction of the course of one of said conveyors and equipped with an arm extensible in the direction of the course of the other conveyor, means for progressively increasing the amplitude of movement of the arm as the carriage advances in its course to compensate for movement of said other conveyor during the carriage travel, means for reversing the direction of movement of said carriage after a row of articles has been placed upon said other conveyor, and means for limiting the amplitude of movement of said arm in transferring the first article in the succeeding row to cause this article to be positioned on said other conveyor at a point spaced from the last preceding article transferred by the desired distance longitudinally of said other conveyor between rows of articles thereon.

20. In transfer apparatus, and in combination with two continuously moving conveyors traveling in courses substantially at right angles one to the other, transfer means for engaging articles one at a time from a single file of articles received upon one of said conveyors and placing them in a succession of equally spaced transverse rows on the other of said conveyors, such means placing the articles in the succession of rows alternately in left-to-right and right-to-left sequences of placement.

21. In transfer apparatus, and in combination with approaching and receding conveyors traveling in courses at right angles to one another, a carriage movable in the direction of the course of the approaching conveyor and equipped with an arm extensible in the direction of the course of the receding conveyor, means borne by the carriage for extending said arm, and an automatic control for said arm-extending means, such control including a light-sensitive element mounted for movement with said carriage and responsive to the advance of a piece of work on said approaching conveyor.

22. In transfer apparatus, and in combination with two conveyors traveling continuously in courses at right angles one to the other, a carriage movable back and forth in the direction of the course of one of said conveyors and equipped with an arm extensible in the direction of the course of the other conveyor, means borne by the carriage for extending and retracting said arm and for moving the carriage along its course, reversing means included in the last-named means, means operated in response to the arrival of the carriage at each end of its path of movement for actuating said reversing means, the means first named including an element effective progressively to increase the amplitude of the movement of said arm from the beginning to the end of each course of the movement of the carriage in each direction and again to start said arm at its lower amplitude at the beginning of each of said courses, whereby the transfer apparatus is operative to transfer articles received in single file upon one of said conveyors to the other of said conveyors and to bring such articles to positions on the other of said conveyors in substantially parallel and equally spaced rows extending transversely thereof.

23. The structure of claim 22, together with means for adjustably varying the lateral spacing between successively transferred articles.

24. The structure of claim 22, together with means for adjustably varying the longitudinal spacing between successively placed rows of articles.

In testimony whereof I have hereunto set my hand.

JULIUS SYLVESTER.